United States Patent [19]

Patton

[11] Patent Number: 5,720,683
[45] Date of Patent: Feb. 24, 1998

[54] MECHANICAL CHAIN TENSIONER WITH BELLEVILLE SPRINGS

[75] Inventor: Mark E. Patton, Dryden, N.Y.

[73] Assignee: Borg-Warner Automotive, Inc., Sterling Heights, Mich.

[21] Appl. No.: 730,615

[22] Filed: Oct. 21, 1996

[51] Int. Cl.⁶ ........................................ F16H 7/08
[52] U.S. Cl. ................ 474/109; 474/137; 474/138
[58] Field of Search ........................ 474/109, 110, 474/134, 135, 137, 138

[56] References Cited

U.S. PATENT DOCUMENTS

| | | | |
|---|---|---|---|
| 4,411,638 | 10/1983 | Wilson | 474/138 |
| 4,416,648 | 11/1983 | Radocaj | 474/135 |
| 4,457,741 | 7/1984 | Hoeptner | 192/111 A X |
| 4,466,803 | 8/1984 | Wilson | 474/138 |
| 4,472,161 | 9/1984 | Ojima | 474/138 X |
| 4,509,935 | 4/1985 | Foster et al. | 474/138 |
| 4,525,153 | 6/1985 | Wilson | 474/138 |
| 4,696,664 | 9/1987 | Wilson | 474/138 |
| 4,767,385 | 8/1988 | Wilson | 474/111 X |
| 5,277,666 | 1/1994 | Kumm | 474/135 X |

OTHER PUBLICATIONS

Rolex Company/National Disc Spring Division catalog (undated), p. 5.

*Primary Examiner*—Roger J. Schoeppel
*Attorney, Agent, or Firm*—Sidley & Austin; Greg Dziegielewski

[57] ABSTRACT

A mechanical tensioner having a piston biased by a spring in a protruding direction. A ratchet assembly includes a spring, a ratchet piston, and a pair of ratchets may also provide a no-return function. A plurality of belleville disc springs provides the force on the tensioner piston, the ratchet piston, or both.

18 Claims, 5 Drawing Sheets

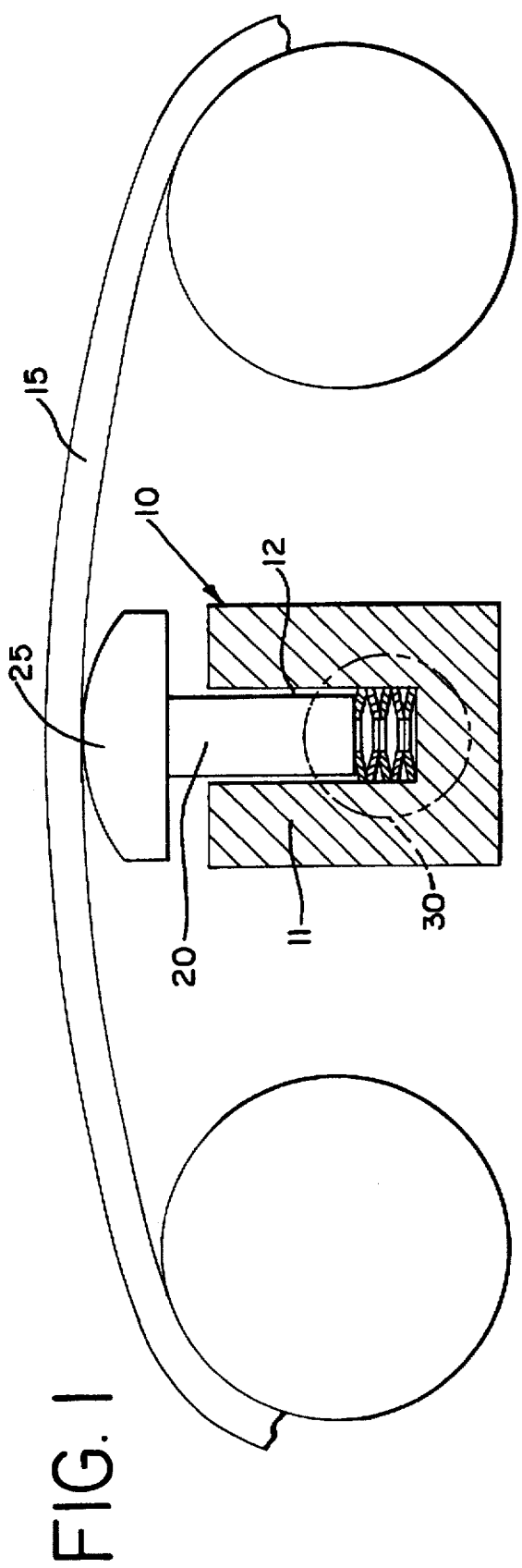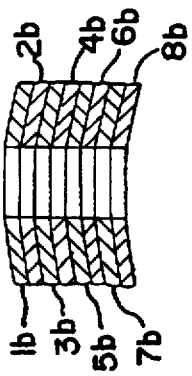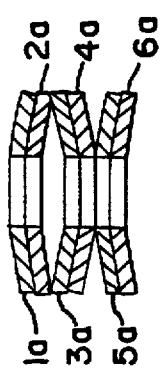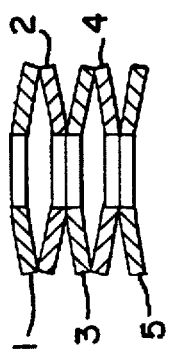

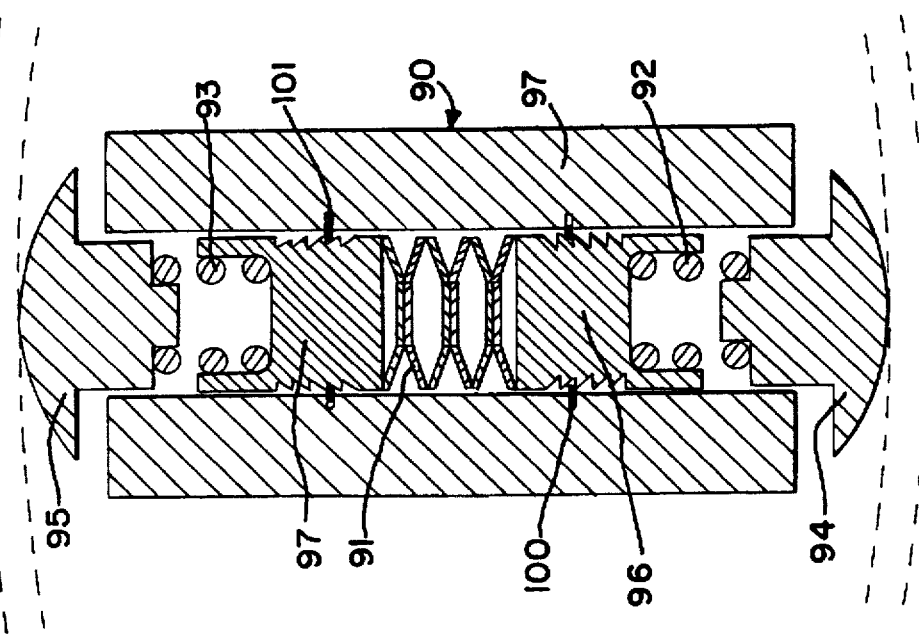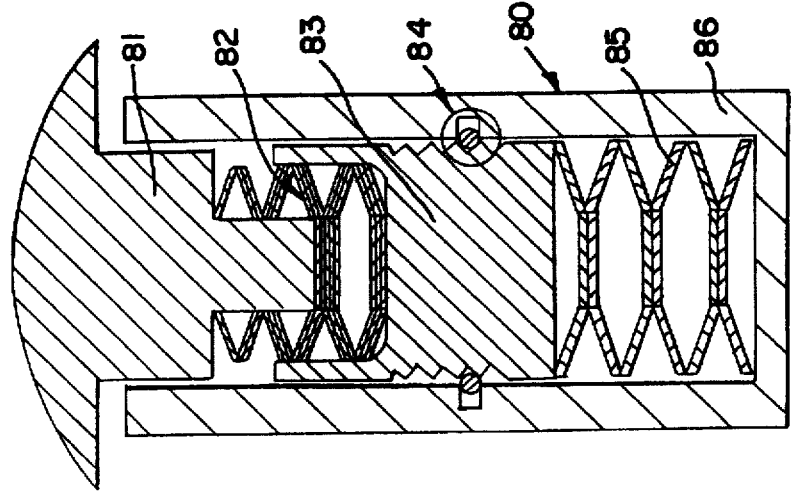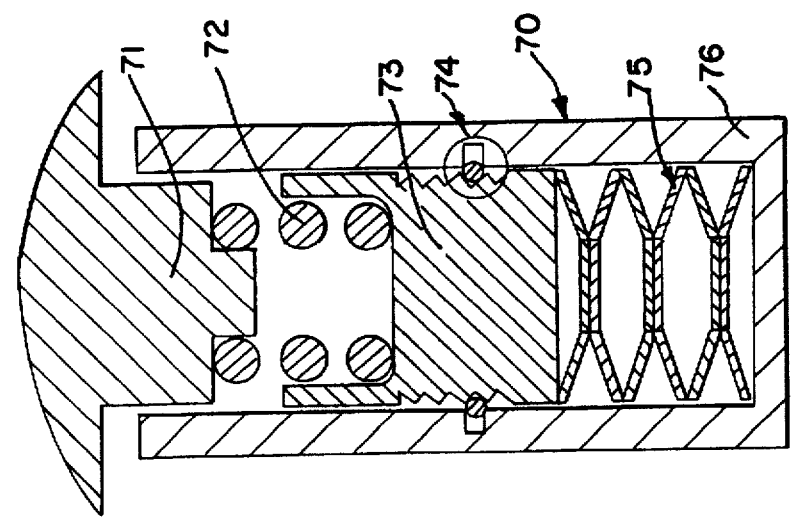

FIG.IIA
PRIOR ART
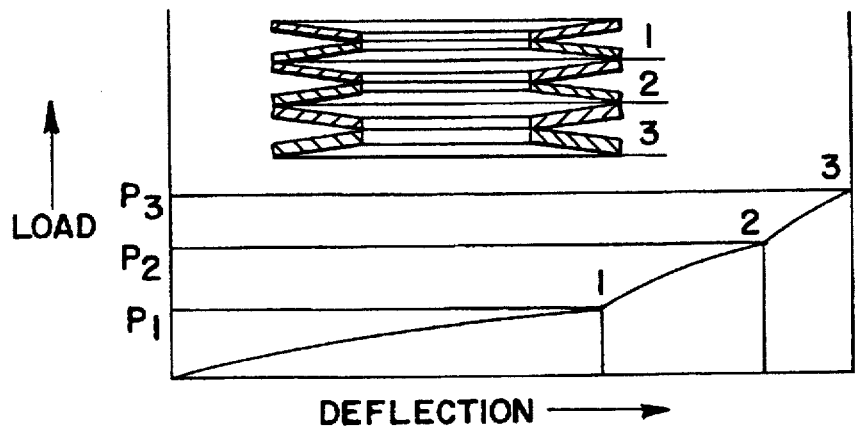
FIG.IIB
PRIOR ART
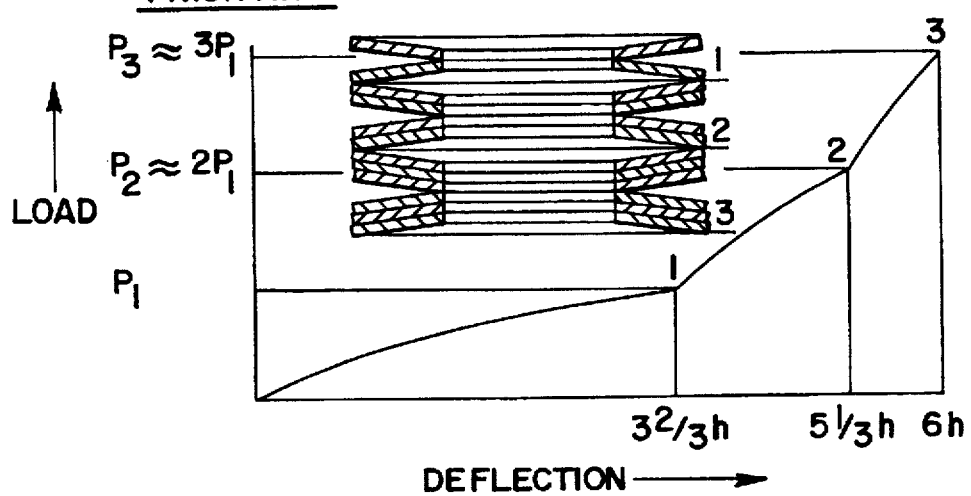

MECHANICAL CHAIN TENSIONER WITH BELLEVILLE SPRINGS

BACKGROUND OF THE INVENTION

The present invention relates to tensioning devices for timing chains, but avoids hydraulic pressure systems by use of stacked belleville disc springs instead of a hydraulic fluid chamber. The belleville disc springs allow the tensioner to provide a variety of force-displacement characteristics as the application requires.

Tensioners are used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A tensioner is used to take up the slack in the chain or belt that connects the camshafts to the crankshaft of the engine timing system.

Most modern engines use hydraulic tensioners alone or with some type of mechanical rack to hold the position of the piston during start-up or while the engine is off. A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction.

As engine speed increases, the torsional oscillations from the camshaft will cause the chain tension to increase. As the chain wears and stretches, the piston of the hydraulic tensioner protrudes outward to take up the excess chain length. The tension in the chain varies with the engine speed and the tensioner responds by adjusting the position of the piston to maintain chain tension. In a hydraulic tensioner, oil is allowed to flow into the piston as the piston moves outward. The tensioner relies on oil leakage to retract the piston as the speed lowers. If the tensioner maintains its position, then high tension is maintained. This combination of high tension and low oil pressure can put undo stress on the camshaft and crankshaft bearings. To avoid this problem, a mechanical tensioner eliminates the use of a fluid system.

A mechanical tensioner resists the downward force from the chain when the chain tightens with a spring force, rather than a combination of spring force and oil pressure in a hydraulic tensioner. The tensioner will resist increases in chain tension by increasing force being provided by the spring. The tensioner piston moves to balance the spring force and the downward force of the chain.

Wilson U.S. Pat. No. 4,696,664 discloses a mechanical tensioner that utilizes spring means to operate between 100% and 50% deflection throughout the entire normal tensioning range of movement of the belt engaging means of a belt tensioner to provide a constant or increasing force on the belt. Wilson addressed the problems of the change in force vectors of the tensioned belt due to wear and heat variations in the engine and oscillation due to cyclic load changes. The spring means comprises a plurality of stacked spring discs, commonly known as belleville spring washers. The belleville disc spring provides the constant or increasing force to take up slack in the chain. The stack of spring washers are compressed by a compressing means, so expansion occurs from approximately a 100% deflection condition to only approximately 50% deflection condition to produce an increasing force as the belt engaging means moves further in the belt tensioning direction.

It is known in the art that a linear relationship between compressive force and displacement is obtained when the discs are stacked in parallel, series, or parallel-series. It is also known in the art that a progressively increasing relationship between load (or force) and displacement is achieved by stacking discs of differing thickness in series or stacking springs of the same thickness in incremental increases. These relationships between displacement and load of different combinations of disc springs are illustrated in the Rolex Company National Disc Spring Division Catalog, a portion of which is reproduced in FIG. 11. In FIG. 11, the prior art discloses the non-linear relationship of load to deflection with stacked differing thickness discs and discs stacked incrementally. FIG. 11a represents the non-linear force-displacement characteristics when the discs are of differing thicknesses. FIG. 11b shows the non-linear force displacement characteristics when the discs are stacked incrementally.

Similar to the Wilson patent, the present invention addresses the problems of chain or belt wear, heat variations in the engine, and oscillation. The present invention uses a belleville disc spring, or combination of springs, to apply a variety of force-displacement characteristics as the application requires. The belleville disc spring in the present invention biases either the tensioner piston or the ratchet piston. In the present invention, the force of the spring is adjusted by the arrangement of the discs. The discs in the tensioner spring are of differing thickness or are arranged incrementally at the lower end of the tensioner piston. The discs in the rachet spring are stacked in combinations of series, parallel-series and parallel at the lower end of the ratchet piston. Conversely, the discs in Wilson are disposed in a particular stacked relation to produce 50–100% deflection on a rod between a pair of flat washer-like members, which are disposed between a lock nut means and the end of a tubular support member.

Wilson also uses a compressing means to compress the stack of washers between the support means and the belt engaging means to deflect the spring washers. In the present invention, the spring expands and contracts in accordance with the force of the chain. Thus, the spring directly controls the chain tension. Wilson also includes fluid dampening means in the belt tensioning system. In contrast, the present invention does not utilize hydraulics and thereby avoids the problems encountered with a hydraulic system.

The present mechanical tensioner has many advantages over a hydraulic tensioner and the prior art mechanical tensioner. During start-up or hot idling, oil is not needed, so cavitation is avoided. Cavitation occurs when the oil cannot enter the chamber fast enough to match the expansion of the chamber from the rising piston. Thus, the chamber does not contain enough oil to properly damp the chain. This invention does not rely on external hydraulic fluid, so it is not affected by low supply pressure, leakage, or temperature variations. Due to the inherent hysteresis damping of stacked belleville spring systems, this invention is applicable to highly resonant systems in which damping characteristics are critical to the system's operation, such as automotive timing and transmission chain drives.

SUMMARY OF THE INVENTION

The present invention is directed to a mechanical chain tensioner having a housing with a bore, a piston slidably received within the bore, a tensioner spring biasing the piston in a protruding direction, and a tensioner arm engaging the tensioned chain system. The tensioner spring is a plurality of belleville disc springs or if a belleville spring ratchet system is included, it may be a coil spring. A belleville disc spring system comprised several discs or belleville washers arranged in series, in parallel-series, or stacked in parallel. The springs' height, outer and inner diameters, thickness, and material of construction can be altered depending on the desired performance characteristics.

This mechanical chain tensioner resists the downward force from the chain with one or more belleville disc springs or both a coil spring and a belleville disc spring. The force required to push the tensioner is set by the size, material, and arrangement of the belleville discs. As the chain slackens, the spring will force the piston out so that the chain tightens. The tensioner will resist increases in chain tension and maintain its position, until the force exceeds the spring force. At that point, the piston will move inward to balance the tensioner force with the increasing downward force of the chain.

In one example of the tensioner, the tensioning spring is a belleville disc spring, or cone washer. The spring resists the downward force from the chain when the chain tightens. As the chain slackens, the force of the disc spring will move the piston out. The tensioner spring maintains the piston position by pushing on the piston as the chain pushes in the opposite direction. The tensioner will resist increases in the chain tension. The characteristics of the spring force can be altered by changes in the size, arrangement, and material of the discs in the spring. When the force from the chain exceeds the set spring force, then the tensioner will move in to prevent the tensioner force from increasing above the downward force. As a result, the endurance limit of the chain will not be exceeded.

In a second example of the tensioner, two tensioner assemblies control the tension of a chain by operating between a pair of sprockets. These assemblies act on both spans of chain between the sprockets. The pistons are opposite one another in one housing. A pair of bores holds a pair of pistons with a pair of belleville disc springs. Each piston has a contact element that engages the tensioned system. Each assembly operates independently and similar to the tensioner described in the first example, but the chain tension is controlled at two points in the chain.

In a third example of the tensioner, the tensioner spring is a coil spring and there is an additional ratchet assembly that provides a no-return function. The ratchet system has a belleville ratchet spring, which includes a movable ratchet piston biased by the spring. The ratchets engage a rack cut into the housing. The ratchet piston is formed with several notches that extend about the periphery of the cylindrical piston. The ratchet piston is biased by a belleville spring and moves outward as the plunger and coil spring move outward. The no-return function is accomplished by locking the notches against a cylindrical washer, which prevents retraction of the piston into the bore. Otherwise, when the chain tightens, the force from the tensioner piston might exceed the counter-force of the belleville spring, so the ratchet piston would retract to its original position.

In a fourth example of the tensioner, the ratchet system has a belleville ratchet spring, a movable ratchet piston biased by the spring, and a pair of overload ratchets engage the ratchet piston and the housing. The overload ratchets cause the ratchet piston to drop when the load is too large.

In the fifth example of the tensioner, the tensioner and ratchet springs are both belleville disc springs. There are also overload ratchets as in the fourth example. The tensioner piston is longer in this example so that it extends into the belleville disc spring.

In the sixth example of the tensioner, a double-sided tensioner with a belleville ratchet spring and two coil tensioner springs controls the tension of a chain by operating between two spans of the chain drive. The coil tensioner springs each bias a piston in a protruding direction, while a single belleville ratchet spring biases both ratchet pistons in a protruding direction toward the chain.

BRIEF DESCRIPTION OF THE DRAWINGS

FIG. 1 is a sectional view of a first embodiment of a mechanical tensioner of the present invention.

FIG. 2 is a sectional view of the belleville disc springs in series.

FIG. 3 is a sectional view of the belleville disc springs in double disc parallel-series.

FIG. 4 is a sectional view of the belleville disc springs stacked in parallel-series.

FIG. 8 is a sectional view of a fourth embodiment of a mechanical tensioner of the present invention.

FIG. 9 is a sectional view of a fifth embodiment of a mechanical tensioner of the present invention.

FIG. 10 is a sectional view of a sixth embodiment of a mechanical tensioner of the present invention.

FIG. 11 is a graph of the non-linear force-displacement characteristics of stacked disc springs disclosed in the prior art.

DETAILED DESCRIPTION OF THE PREFERRED EMBODIMENTS

Figure 5:
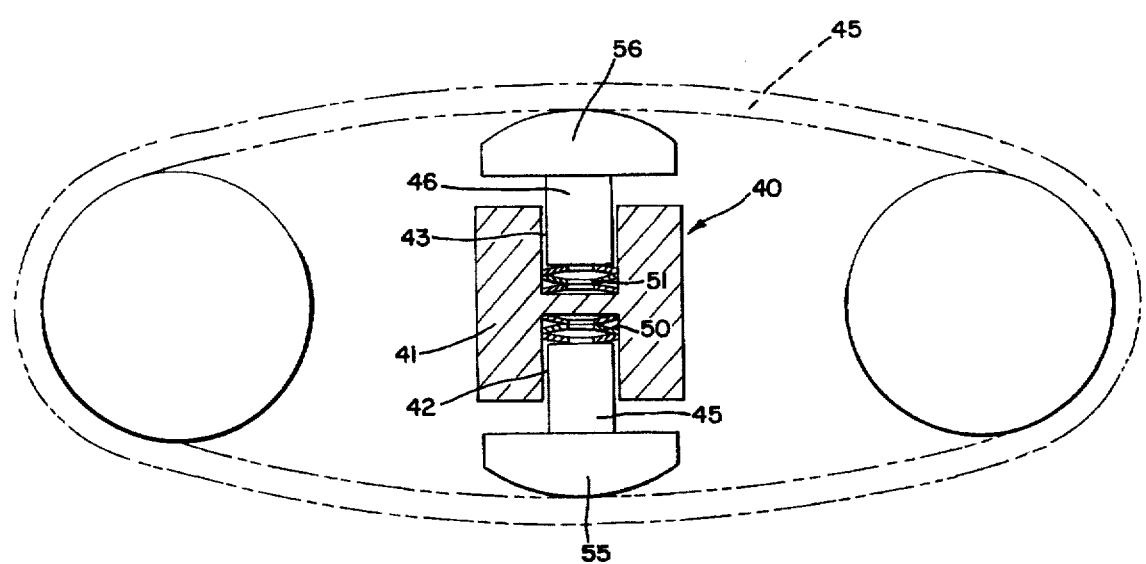
FIG. 5 is a sectional view of a second embodiment of a mechanical tensioner of the present invention.

FIG. 1 illustrates the tensioner 10. The tensioner 10 includes a housing 11 having a bore 12 and a piston 20 biased by a belleville spring 30. The height, outer and inner diameters, thickness, and material of construction of the belleville spring 30 can be altered, depending on the results desired.

The belleville spring, shown in FIG. 2, is comprised of several belleville discs in series. Discs 1, 2, 3, 4, and 5 are in series with one another, where no two discs are parallel to one another. The belleville discs can also be arranged in parallel-series, where several stacked discs are parallel to another series of stacked discs, as shown in FIG. 3. Discs 1a and 2a stacked in parallel are in series with discs 3a and 4a stacked in parallel and discs 3a and 4a are in series with discs 5a and 6a stacked in parallel. In other words, the discs mirror each other if they are in series, and the discs fit within one another if they are parallel.

In FIG. 4, the discs 1b, 2b, 3b, 4b, 5b, 6b, 7b, and 8b are stacked in parallel so that each disc is arranged the same as the other discs. The load magnitude and stiffness depend on the arrangement of the springs. The belleville discs in series will have a greater displacement than the discs in parallel-series and stacked parallel because the disc arrangement takes up more space, but requires less force for displacement of a certain distance. On the other hand, the belleville discs in parallel have the least displacement with force, the piston will move in and out at a shorter distance. Since the spring 30 can sustain large loads with small deflections, the springs take up less area than a typical coil spring. The arrangement of the discs in belleville spring 30 are such that non-linear force versus displacement characteristics result.

The belleville spring 30 biases the piston 20 in a protruding direction. The tensioner 10 also includes a tensioner arm 25 engaging the chain 15. As the chain 15 slackens, the belleville spring 30 will force the piston 20 out so that the chain 15 tightens. The tensioner 10 will resist increases in chain tension, until the force exceeds the spring force. At that point, the piston 20 will return inward toward the bore 12. As a result, the endurance limit of the chain 15 will not be exceeded.

FIG. 5 illustrates a tensioner 40 with two tensioner assemblies that control the tension of the chain 45 by operating between both spans of chain in the chain drive. These assemblies are opposite one another and have a housing 41, a pair of bores 42 and 43, a pair of pistons 45 and 46, a pair of belleville disc springs 50 and 51, and a pair of contact elements 55 and 56 engaging the chain 45. Each assembly operates independently and similar to the tensioner 10 described in the first example, but the chain tension is controlled at two points in the chain 45.

Figure 6:
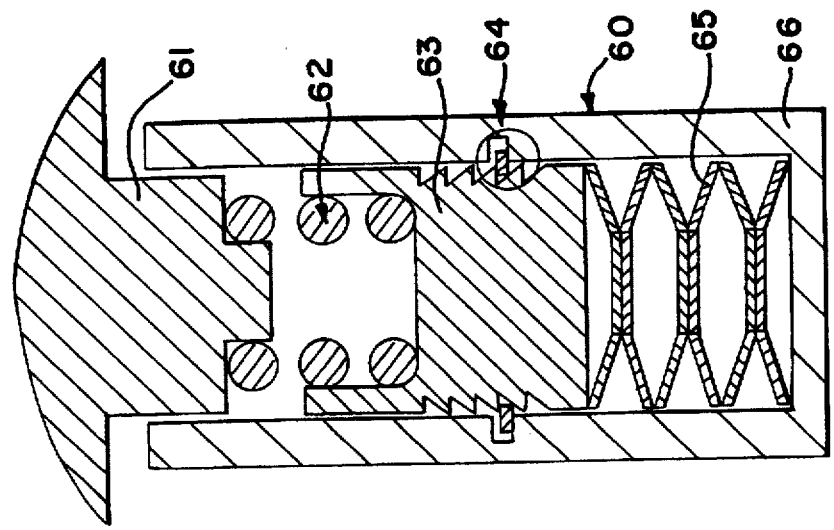
FIG. 6 is a sectional view of a third embodiment of a mechanical tensioner of the present invention.

FIG. 6 illustrates the tensioner 60 with the tensioner spring 62 as a coil spring. The coil spring 62 moves the tensioner piston 61 out. The coil spring 62 provides a high response rate for the upward force in the tensioner 60. In addition, there is a ratchet assembly that provides a no-return function within housing 66. The ratchet system has a belleville ratchet spring 65, a movable ratchet piston 63 biased by the spring 65, and a circular ratchet 64, such as a washer, engaging the ratchet piston 63 and the housing 66. The ratchet piston 63 is formed with several notches that hold the ratchet piston 63 in place. The ratchet piston 63 is biased by the belleville spring 65 and moves outward with the tensioner piston 61. This belleville spring 65 has a near constant force with displacement. As the force from the chain approaches the maximum force of the coil 62, the ratchet piston 63 will move down a notch. The belleville spring's displacement in relation to force is more than the coil spring, so the belleville spring 65 is able to retract with the ratchet piston 63 to decrease the force on the coil spring 62. The no-return function prevents retraction of the piston 61 into the bore when the engine is not operating, but does not inhibit the function of the tensioner during normal operations. Specifically, when the chain tightens, the force from the tensioner piston 61 will exceed the counter-force of the ratchet piston 63, so the ratchet piston 63 will retract to its original position.

Figure 7:
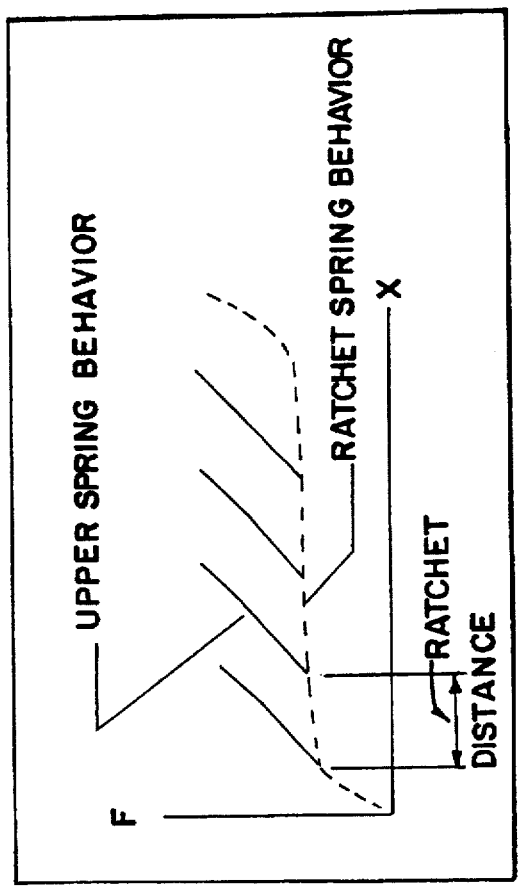
FIG. 7 is a graph of the expected relationship between spring displacement and force based on predicted results.

FIG. 7 displays a graph of the predicted relationship between force and displacement for the third embodiment of this invention shown in FIG. 6. The ratchet spring curve is constant through long displacement, which is favorable in tensioners. The force increases only during start-up and after the ratchet reaches the last notch on the ratchet piston. Conversely, the tensioner spring force increases steadily as the displacement increases. As the ratchet piston moves up a notch, the force quickly drops, and then steadily increases until the ratchet piston moves up another notch. As a result, the coil spring produces several sloping curves. The graph curves can also be modified by using various springs to obtain the result desired.

In FIG. 8, the tensioner 70 has a ratchet system with a belleville ratchet spring 75, a movable ratchet piston 73 biased by the spring 75, and a pair of overload ratchets 74 engaging the ratchet piston 73 and the housing 76. This embodiment operates similarly to the embodiment shown in FIG. 6, but contains overload ratchets 74. The overload ratchets 74 cause the ratchet piston 73 to drop when the load is too large. The overload ratchets may be, for example, a circular ring that can expand outward into the recess cut in the bore. This is particularly useful during normal operations when the chain tightens and forces the tensioner piston 71 in toward the bore. When the load reaches a certain point, then the overload ratchets 74 will allow the ratchet piston 73 to drop into the bore.

FIG. 9 illustrates the tensioner 80 having a housing 86, tensioner piston 81, ratchet piston overload ratchets 84, tensioner spring 82, and ratchet spring 85. The tensioner piston 81 is longer in this example so that it extends into the belleville disc spring 82. In this tensioner, the tensioner spring 82 and the ratchet spring 85 are both belleville disc springs. The force-displacement curve can be adjusted by arranging the discs in both springs in tensioner 80, instead of arranging just the ratchet spring as in some of the tensioners described above. By arranging differing thickness discs stacked in series, the thicker springs will deflect less when the force increases. The thicker disc produces less deflection. The same result is achieved when discs with the same thickness are stacked in incrementally increasing sections. For example, the first section may contain two discs in series with each other, the second section may contain two discs in series with two other discs, and the third section may contain three discs in series with three other discs. As a result, there is a greater displacement with the belleville disc spring, so the tensioner 80 will withstand a greater chain force than the previous tensioners and keep the force on the chain constant.

FIG. 10 illustrates a double-sided tensioner 90 with a single housing 98, a belleville ratchet spring 91 and two coil tensioner springs 92 and 93 controlling the tension of a chain by operating drive to drive. The coil tensioner springs 92 and 93 each bias a piston 94 and 95, respectively, in a protruding direction. The belleville ratchet spring 91 biases both ratchet pistons 96 and 97 in a protruding direction toward the chain. The ratchets 100 and 101 provide a no-return function for the ratchet pistons 96 and 95, respectively.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A mechanical chain tensioner comprising:

a housing having a first bore;

a piston slidably received within the first bore;

a plurality of belleville disc springs having non-linear force-displacement characteristics, said springs biasing the piston at a first end in a protruding direction from said bore, said disc springs including a first and second disc spring of a first thickness stacked in series; and a tensioner arm at a second end of said piston for engaging a chain.

2. The chain tensioner of claim 1 wherein a third disc spring is stacked in series with a fourth disc spring of a second thickness, said third disc spring being stacked in series with said second disc spring, said second thickness being greater than said first thickness.

3. The chain tensioner of claim 2 wherein a fifth disc spring is stacked in series with a sixth disc spring of a third thickness, said fifth disc spring being stacked in series with said fourth disc spring, said third thickness being greater than said second thickness.

4. The chain tensioner of claim 1 wherein a third disc spring is stacked in parallel with a fourth disc spring, said third disc spring being stacked in series with said second disc spring.

5. The chain tensioner of claim 4 wherein a fifth disc spring is stacked in parallel with a sixth disc spring, said fifth disc spring being stacked in series with said fourth disc spring.

6. The chain tensioner of claim 5 wherein a seventh disc spring is stacked in parallel with an eighth and ninth disc spring, said seventh disc spring being stacked in series with said sixth disc spring.

7. The chain tensioner of claim 6 wherein a tenth disc spring is stacked in parallel with an eleventh and twelfth disc spring, said tenth disc spring being stacked in series with said ninth disc spring.

8. The chain tensioner of claim 1 wherein said housing includes a second bore at an opposite end from said first bore, said second bore including a second piston protruding from said second bore in a direction opposite said first piston.

9. A mechanical chain tensioner comprising:

a housing having a first bore;

a piston slidably received within the first bore;

a first spring biasing the piston at the first end in a protruding direction from said bore;

a tensioner arm at a second end of said piston for engaging a chain;

a second spring biasing a movable ratchet piston in a protruding direction from said bore, said second spring including a plurality of belleville disc springs;

said ratchet piston located between said first spring and said second spring;

a ratchet located for engagement of said ratchet piston and said first bore.

10. The chain tensioner of claim 9 wherein said second spring includes a first and a second disc spring stacked in series.

11. The chain tensioner of claim 10 wherein said second spring includes a third, a fourth, a fifth, a sixth, a seventh, and an eighth spring stacked in series with said first and second springs.

12. The chain tensioner of claim 10 wherein said second spring includes a third disc spring stacked in parallel with said second spring, a fourth disc spring stacked in series with said third disc spring, a fifth disc spring stacked in parallel with said fourth disc spring, and a sixth disc spring staked in series with said fifth disc spring.

13. The chain tensioner of claim 9 wherein said second spring includes a first and second disc spring stacked in parallel, a third disc spring stacked in parallel with said second disc spring, a fourth disc spring stacked in parallel with said third disc spring, and a fifth disc spring stacked in parallel with said fourth disc spring.

14. The mechanical tensioner of claim 9 wherein said ratchet is an expandable ring.

15. The chain tensioner of claim 9 wherein said first spring is a coil spring.

16. The chain tensioner of claim 9 wherein the said first spring includes a plurality of belleville disc springs.

17. The chain tensioner of claim 9 wherein said housing includes a second bore at an opposite end from said first bore, said second bore including a second piston protruding from said second bore in a direction opposite said first piston and a second ratchet piston biased by said belleville disc springs.

18. The chain tensioner of claim 9 wherein said housing includes a second bore at an opposite end from said first bore, said second bore including a second piston protruding from said second bore in a direction opposite said first piston and a second ratchet piston protruding from said second bore in a direction opposite said first ratchet piston.

* * * * *